(12) United States Patent
Kaku

(10) Patent No.: US 7,187,408 B2
(45) Date of Patent: Mar. 6, 2007

(54) DIGITAL CAMERA

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 646 days.

(21) Appl. No.: 10/073,006

(22) Filed: Feb. 12, 2002

(65) Prior Publication Data
US 2002/0109780 A1 Aug. 15, 2002

(30) Foreign Application Priority Data
Feb. 14, 2001 (JP) ............... 2001-036791

(51) Int. Cl.
H04N 5/76 (2006.01)
(52) U.S. Cl. ............... 348/231.6; 348/231.99
(58) Field of Classification Search .......... 348/207.99, 348/231.1, 231.99, 231.6, 222.1; 382/232, 382/235; 386/109, 112, 117
See application file for complete search history.

(56) References Cited
U.S. PATENT DOCUMENTS 5,444,483 A * 8/1995 Maeda ............. 348/231.6
5,576,758 A * 11/1996 Arai et al. ......... 348/231.99
5,821,997 A * 10/1998 Kawamura et al. ...... 348/231.6
6,788,341 B2 * 9/2004 Tsunoda et al. ........ 348/231.1
6,903,776 B1 * 6/2005 Tsujino et al. ......... 348/221.1
2004/0105585 A1 * 6/2004 Yokonuma .............. 382/232

FOREIGN PATENT DOCUMENTS

| JP | 05-064143 | 3/1993 |
| JP | 09-023405 | 1/1997 |
| JP | 11-122573 | 4/1999 |
| JP | 2000-125255 | 4/2000 |

* cited by examiner

Primary Examiner—David Ometz
Assistant Examiner—Luong T. Nguyen
(74) Attorney, Agent, or Firm—Westerman, Hattori, Daniels & Adrian, LLP.

(57) ABSTRACT

A digital camera includes a shutter button. An optimal compression ratio of an image signal fetched in response to a photographing instruction from the shutter button is predicted prior to the photographing instruction. More specifically, an image signal fetched before application of the photographing instruction is compressed by a JPEG codec, and the optimal compression ratio is predicted based on a size of a compressed image signal thus obtained. An image signal fetched in response to the photographing instruction is compressed on the basis of the optimal compression ratio, and a compressed image signal thus obtained is recorded onto a recording medium.

4 Claims, 5 Drawing Sheets

DIGITAL CAMERA

BACKGROUND OF THE INVENTION

1. Field of the Invention

The present invention relates to a digital camera applied to a camera used by the consuming public as a hobby and a surveillance camera set in a bank for security. More specifically, the present invention relates to a digital camera for recording a photographed image signal generated in response to a photographing instruction onto a recording medium in a compressed-state.

2. Description of the Prior Art

In a conventional digital camera (1) for recording a motion image formed by a plurality of still images, a still image signal of a first frame is compressed at an initial compression ratio, and a compression ratio after a second frame and later is determined on a size of a compressed still image signal at the previous frame. In a conventional digital camera (2) for photographing a still image, a photographed still image signal is compressed at each different compression ratio so as to detect a compression ratio capable of obtaining a compressed still image signal of a target size.

However, there is a problem in the digital camera (1) that as to the several frames from the top, the compression ratio is largely deviated from an optimal compression ratio depending on the object, and therefore, a compressed image size exceeds a target size where a compression ratio is too small, and a noise occurs in a decompressed image where a compression ratio is too large. Furthermore, there is a problem in the digital camera (2) that the more compression processing is repeated, the longer it takes a time from obtaining of a photographed image signal to end of the recording of a compressed image signal, and therefore, a shutter interval becomes longer.

SUMMARY OF THE INVENTION

Therefore, it is a primary object of the present invention to provide a novel digital camera.

Another object of the present invention is to provide a digital camera capable of performing proper recording processing from the start when recording a motion image.

Further object of the present invention is to provide a digital camera capable of shortening a shutter interval when recording a still image.

According to the present invention, a digital camera which records a photographed image signal generated in response to a photographing instruction into a recording medium in a compressed state, comprises: a predictor for predicting an optimal compression ratio capable of compressing the photographed image signal up to a target size prior to the photographing instruction; a compressor for compressing the photographed image signal on the basis of the optimal compression ratio; and a recorder for recording a compressed photographed image signal generated by the compressor into the recording medium.

When the photographed image signal generated in response to the photographing instruction is recorded onto the recording medium in a compressed state, the predictor predicts the optimal compression ratio capable of compressing the photographed image signal up to the target size prior to the photographing instruction. The photographed image signal is compressed by the compressor on the basis of the optimal compression ratio, and the compressed photographed image signal thus generated is recorded onto the recording medium by the recorder.

The optimal compression ratio of the photographed image signal is predicted prior to the photographing instruction. Accordingly, as to a digital camera for recording a motion image, a proper motion image recording can be performed immediately after application of the photographing instruction. As to a digital camera for recording a still image, a shutter interval can be shortened.

In a preferable embodiment, it is determined whether or not a first size of the compressed photographed image signal satisfies the size condition including the target size by a determiner. A corrector corrects the optimal compression ratio in accordance with the determination result of the determiner, and a recorder records the compressed photographed image signal according to the corrected optimal compression ratio.

In another preferable embodiment, an object image is photographed by a photographer prior to the photographing instruction. An image signal outputted by the photographer is compressed by an image compressor, and the optimal compression ratio is predicted on the basis of a second size thus obtained of the compressed image signal. The image signal and the photographed image signal have the same resolution with each other, and in a case the photographer outputs the image signal at predetermined interval, an image based on each image signal may be displayed.

Furthermore, in a case a memory having a plurality of memory areas is prepared, and the outputted image signal at a predetermined interval from the photographer is selectively written to the plurality of memory areas, the image compressor should read the image signal from a memory area to which no writing is performed.

In another preferable embodiment, the digital camera has a motion image recording function, and the photographed image signal is a still image signal of a top frame forming a recording motion image signal.

In further preferable embodiment, the photographed image signal is a still image signal of one frame.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
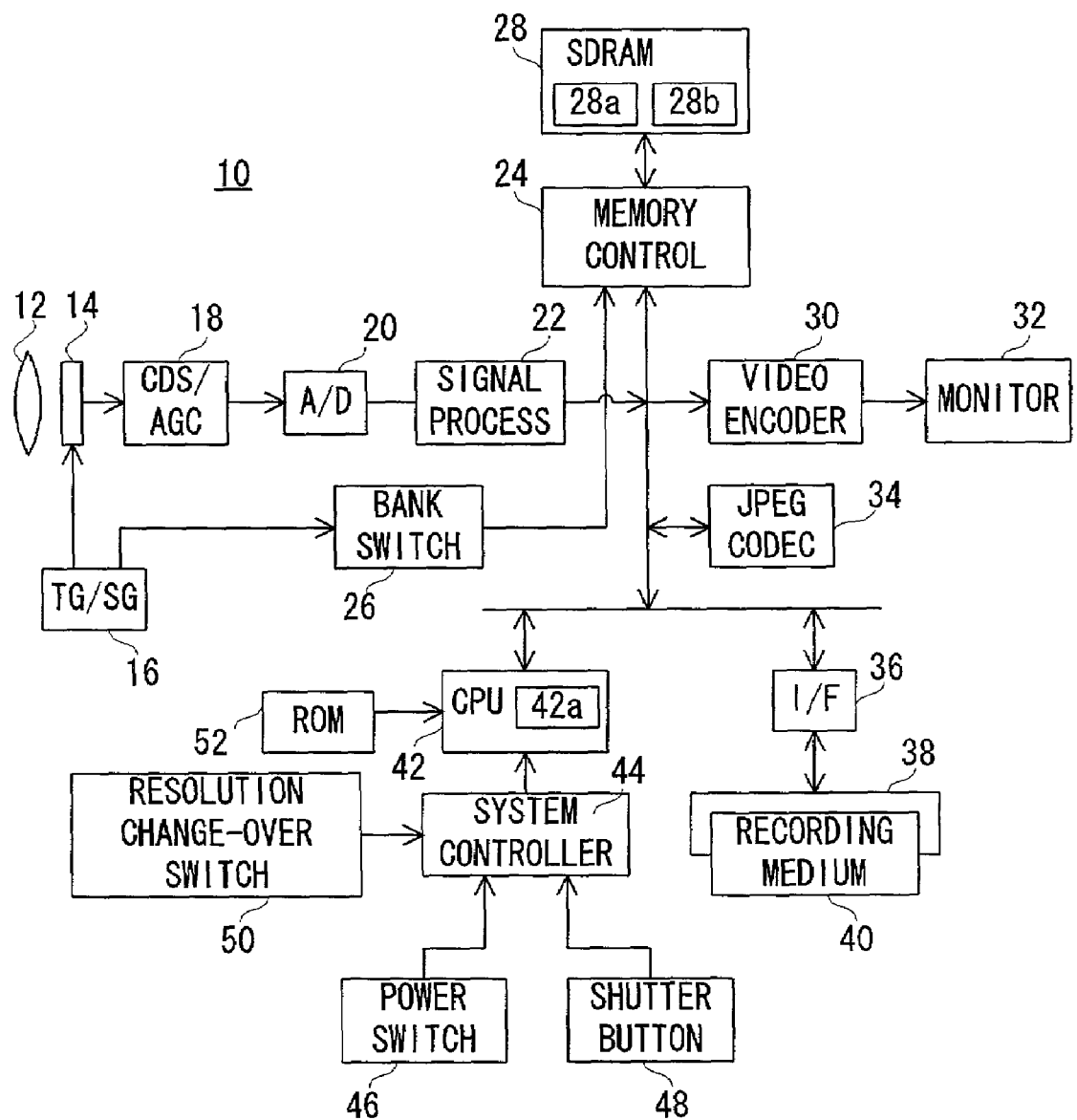
FIG. 1 is a block diagram showing one embodiment of the present invention.

Referring to FIG. 1, a digital camera (surveillance camera) 10 of this embodiment has a motion image recording function and includes an optical lens 12. An optical image of an object is incidented to a light-receiving surface of an image sensor 14 through the optical lens 12. The light-receiving surface is provided with a color filter (not shown) of a primary color Bayer array, and a charge amount generated in each light-receiving element reflects light quantity corresponding to each primary color component.

When a power switch 46 is turned on, a system controller 44 applies to a CPU 42 a state signal indicative of a state of the power switch 46 and a resolution change-over switch 50. The CPU 42 sets a selected resolution to a TG/SG 16, a signal processing circuit 22 and a video encoder 30, and activates a signal processing block including the image sensor 14, the TG/SG 16, the signal processing circuit 22, etc. and an encode block including the video encoder 30, a monitor 32, etc. It is noted that selectable resolutions are two kinds of QVGA (320 pixels×240 lines) and VGA (640 pixels×480 lines).

When a resolution of "QVGA" is selected, the TG/SG 16 generates a vertical synchronization signal every 1/30 second, and performs thin-out reading of 30 fps on the image sensor 14 in response to the vertical synchronization signal. An RGB signal having a vertical number of pixels of "240" is outputted every 1/30 second from the image sensor 14. On the other hand, when a resolution of "VGA" is selected, a vertical synchronization signal is generated every 1/15 second, and in response to the vertical synchronization signal, thin-out reading of 15 fps is performed on the image sensor 14. An RGB signal having a vertical number of pixels of "480" is outputted from the image sensor 14 every 1/15 second.

The outputted RGB signal of each frame is subjected to noise removal and level adjustment in a CDS/AGC circuit 18, and the RGB signal thus processed is applied to the signal processing circuit 22 through an A/D converter 20. The signal processing circuit 22 performs a horizontal thining-out, color separation, white balance control, YUV conversion, etc. on the applied RGB signal so as to generate a YUV signal. When a resolution of "QVGA" is selected, a horizontal number of pixels is thinned out to "320", and a YUV signal of a QVGA resolution is outputted every 1/15 second from the signal processing circuit 22. On the other hand, when a resolution of "VGA" is selected, the horizontal number of pixels is thinned out to "640", and a YUV signal of a VGA resolution is outputted every 1/30 second from the signal processing circuit 22. The outputted YUV signal is written to a display image area 28a of an SDRAM 28 through a memory control circuit 24.

The video encoder 30 reads out the YUV signal stored in the display image area 28a through the memory control circuit 24, and converts the read YUV signal into a composite image signal. The YUV signal is read out in an interlace-scan scheme every 1/60 second, and the read YUV signal of each field is converted to the composite image signal. The converted composite image signal is applied to the monitor 32, and therefore, a real-time motion image (through image) of the object is displayed on a screen. It is noted that since a resolution of the monitor 32 is lower than that of QVGA, thin-out processing is performed in a corresponding manner to a selected resolution in the video encoder 30, and whereby, a composite image signal having the same resolution as the monitor 32 is generated.

A bank switch circuit 26 generates a bank switch signal in response to the vertical synchronization signal outputted from the TG/SG 16 and applies the generated bank switch signal to the memory control circuit 24. When the resolution of "QVGA" is selected, since the vertical synchronization signal is generated every 1/30 second, a level of the bank switch signal is switched between a high-level and a low-level every 1/30 second. When the resolution of "VGA" is selected, since the vertical synchronization signal is generated every 1/15 second, the level of the bank switch signal is switched between the high-level and the low-level every 1/15 second.

Figure 2:
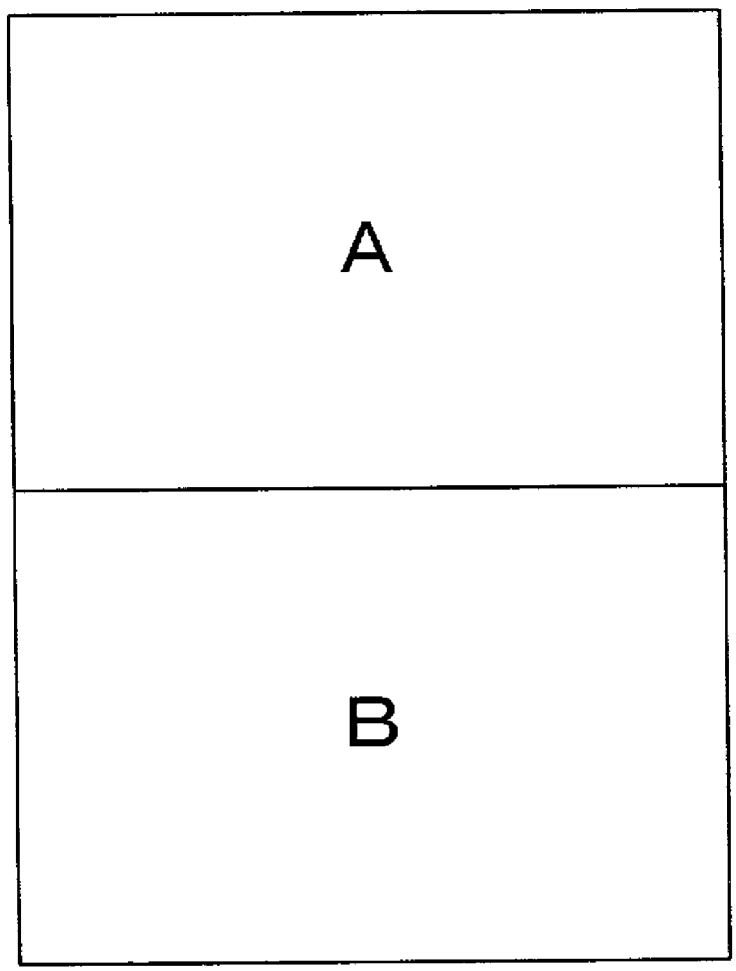
FIG. 2 is an illustrative view showing a mapping state of a display image area formed on an SDRAM.

The display image area 28a is formed with banks A and B as shown in FIG. 2. The memory control circuit 24, when the bank switch signal indicates the high-level, considers the bank A as a writing destination of the YUV signal and the bank B as a reading destination of the YUV signal. When the bank switch signal indicates the low-level, the bank B is considered to be a writing destination of the YUV signal, and the bank A is considered to be a reading destination of the YUV signal.

Accordingly, as to the frame in which the bank switch signal indicates high in level, the YUV signal outputted from the signal processing circuit 22 is written to the bank A, and the YUV signal read from the bank B is applied to the video encoder 30. As to the frame in which the bank switch signal indicates low in level, the YUV signal outputted from the signal processing circuit 22 is written to the bank B, and the YUV signal read from the bank A is applied to the video encoder 30. It is noted that when the resolution of "QVGA" is selected, the signal processing circuit 22 writes the YUV signal of 15 fps to the SDRAM 28 through the memory control circuit 24. Accordingly, the video encoder 30 reads out the YUV signal of the same frame twice.

When a through image is displayed on the monitor 32, the CPU 42 applies a compression instruction to a JPEG codec 34 in response to the vertical synchronization signal. The JPEG codec 34 reads the YUV signal of each frame from the display image area 28a through the memory control circuit 24. The reading destination is described above. The YUV signal is read out of the bank B where the bank switch signal is high in level, and the YUV signal is read out of the bank A where the bank switch signal is low in level.

The JPEG codec 34 actually subjects the read YUV signal to JPEG compression so as to determine a size (compressed size) of a compressed YUV signal. The determined compressed size value is applied to the CPU 42. The CPU 42 obtains a compression ratio of the next frame Q f next according to a equation 1 based on the applied compressed size value, a target size value and a compression ratio of the current frame Q f crnt.

$$Q\,f\,\text{next}=Q\,f\,\text{crnt}+100\times(\text{target size}-\text{compressed size})/\text{target size} \quad \text{[Equation 1]}$$

The JPEC compression is performed by a series of processing of DCT conversion, quantization, and Huffman coding. Herein, the quantization is performed by utilizing a quantization table, and the compressed size is determined depending on the amount of a high-frequency component included in the YUV signal and a table value of the quantization table. The Qf (Qf crnt or Qf next) is a coefficient for correcting the table value. For example, the table value is a value of 1.2 times of an initial value for Qf=1.2, and the table value is a value of 0.9 times of the initial value for Qf=0.9.

In this embodiment, such the Qf is defined as the compression ratio and the next compression ratio Qf next is calculated according to the equation 1. Accordingly, a compression ratio set to the JPEG codec 34 is renewed every one frame even while the shutter button 48 is not operated, and each compression ratio is a value approximate to an optimal compression ratio capable of compressing the YUV signal of each frame to the target size. That is, the optimal compression ratio is predicted according to the calculation according to the equation 1. It is noted that the target size depends on the selected resolution.

When the shutter button 48 is pressed, a corresponding state signal is applied to the CPU 42 from the system controller 44. The CPU 42 instructs the JPEG codec 34 to perform the compression processing as described above. The JPEG codec 34 reads the YUV signal from the display image area 28a through the memory control circuit 24, performs the JPEG compression on the read YUV signal so as to determine the compressed size, and applies the determined compressed size vale to the CPU 42. The CPU 42 determines if the applied compressed size value satisfies a size condition shown in an equation 2 or not.

$$\text{target size value} \times 0.9 < \text{compressed size value} \leq \text{target size value} \quad \text{[Equation 2]}$$

When the determined compressed size vale satisfies the size condition, the CPU 42 shifts to motion image recording processing. On the other hand, when the determined compressed size value does not satisfy the size condition, renew processing of the optimal compression ratio according to the equation 1 and compression processing of the same YUV signal by the renewed optimal compression ratio are repeated. Since the compression ratio is periodically renewed prior to an operation of the shutter button 48, the compressed size value determined after the operation of the shutter button 48 satisfies the size condition shown in the equation 2 by performing compression ratio renew processing, at most, 3 times. Accordingly, the motion image recording processing is started in response to a second vertical synchronization signal generated after the shutter button 48 is pressed.

Taking the fact into consideration that reading out of the YUV signal from the display image area 28a is late for writing of the YUV signal to the display image area 28 by one frame, and that the motion image recording processing is started in response to the second vertical synchronization signal after the shutter button 48 is operated, the compressed YUV signal of a top frame to be recorded corresponds to a object image photographed in response to the vertical synchronization signal immediately after the shutter button 48 is operated.

Shifting to the motion image recording, the JPEG codec 34 stores the compressed YUV signal of each frame generated by the JPEG compression to the compressed image area 28b of the SDRAM 28 through the memory control circuit 24. Herein, the compression ratio of the next frame set to the JPEG codec 34 is determined depending on the compressed size value of the current frame, the target size value and the compression ratio of the current frame. That is, after shifting to the motion image recording, the compression ratio is renewed according to the equation 1. The CPU 42 reads the compressed YUV signal stored in the compressed image area 28b through the memory control circuit 24, and records the read compressed YUV signal onto the recording medium 40 through an I/F circuit 36.

In this manner, where the selected resolution is "QVGA", a motion image signal of the QVGA resolution having a frame rate of 30 fps is recorded on the recording medium 40 in a compressed state. On the other hand, where the selected resolution is "VGA", a motion image signal of the VGA resolution having a frame rate of 15 fps is recorded on the recording medium 40 in a compressed state.

It is noted that the CPU 42 is a multitask CPU installed with a real-time OS such as μi TRON, and the compressed YUV signal accumulated in the compressed image area 28b is recorded on the recording medium 40 by BG (Back Ground) processing. Furthermore, the recording medium 40 is detachable and is connected to the I/F circuit 36 when attached to a slot 38.

Before and after an operation of the shutter button 48, the compression ratio of the next frame is calculated according to the equation 1 on the basis of the compressed size of the current frame. Since the calculated compression ratio is a compression ratio most suitable for the current frame, even if the YUV signal of the next frame is compressed at such the compression ratio, the compressed YUV signal does not necessarily satisfy the size condition. However, since the YUV signal is generated every 1/30 second or 1/15 second, the time period to this extent never drastically change a object image between the current frame and the next frame. Accordingly, an appropriate compression ratio is calculated by performing an arithmetic operation of the equation 1.

Figure 3:
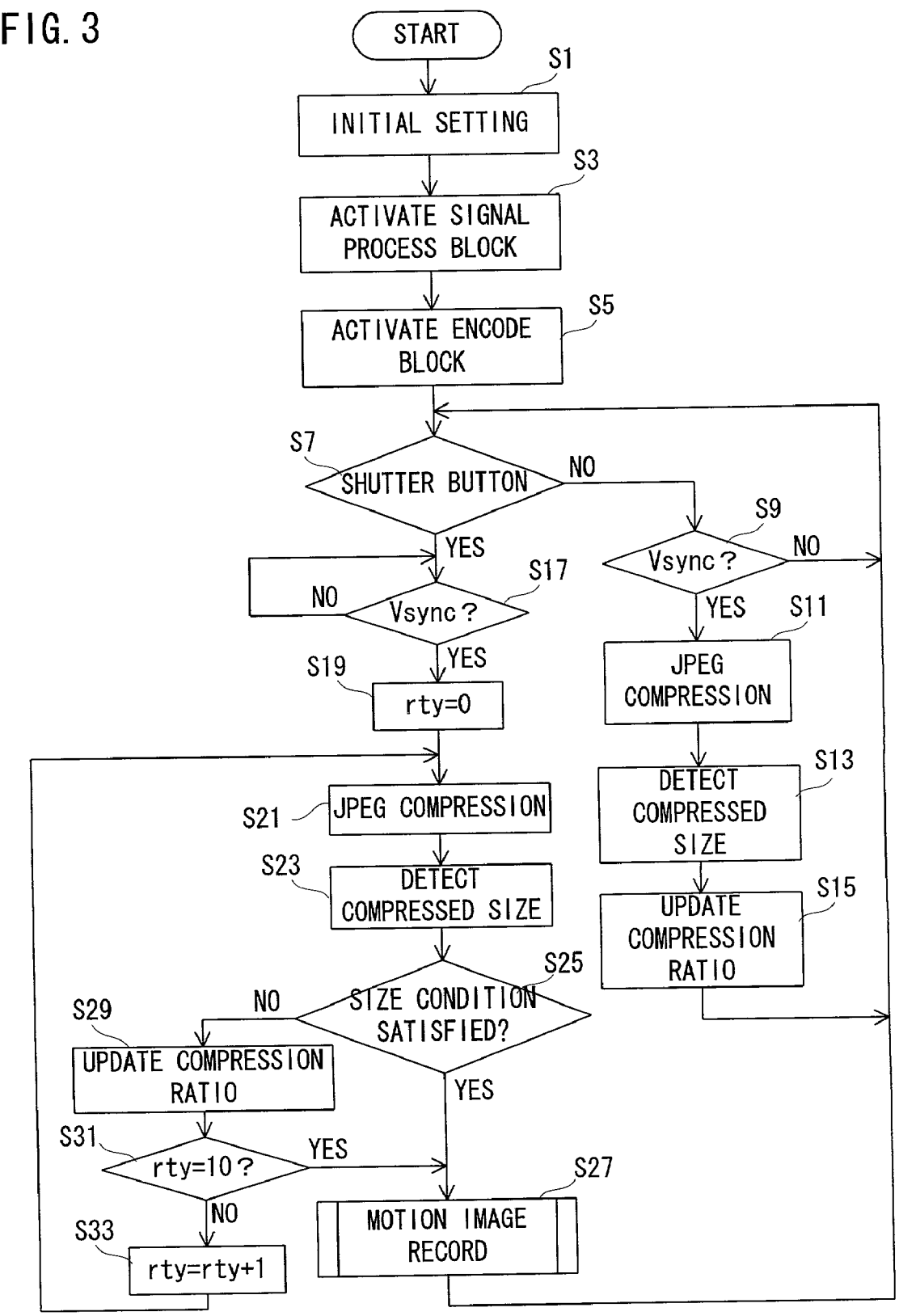
FIG. 3 is a flowchart showing a part of operation in FIG. 1 embodiment.

When the power switch 46 is turned on, the CPU 42 processes a flowchart shown in FIG. 3 according to a program stored in a ROM 52. First, in a step S1, the selected resolution is set to the TG/SG 16, the signal processing circuit 22 and the video encoder 30, and an initial compression ratio corresponding to the selected resolution is set to the JPEG codec 34. When the initial setting is completed, the signal processing block and the encode block are activated in respective steps S3 and S5. Thus, the YUV signal of the QVGA resolution or the VGA resolution is generated at a frame rate of 30 fps or 15 fps, and the through image based on the signal is displayed on the monitor 32.

It is determined whether or not the shutter button 48 is operated in a step S7, and it is determined whether or not the vertical synchronization signal is generated in a step S9. When the vertical synchronization signal is generated in a state that the shutter button 48 is not operated, the process proceeds from the step S9 to a step S11 so as to instruct the JPEG codec 34 to perform the JPEG compression. The JPEG codec 34 reads the YUV signal from the display image area 28a through the memory control circuit 24, and actually performs the JPEG compression on the read YUV signal so as to determine the compressed size. The determined compressed size value is taken from the JPEG codec 34 in a step S13, and the compression ratio of the JPEG codec 34 is renewed according to the equation 1 in a following step S15. Thus, the optimal compression ratio is predicted. When the resolution of "QVGA" is selected, the optimal compression ratio is predicted every 1/30 second, and the resolution of "VGA" is selected, the optimal compression ratio is predicted every 1/15 second.

When the shutter button 48 is operated, the process proceeds from the step S7 to a step S17 so as to determine whether the vertical synchronization signal is generated or not. When the vertical synchronization signal is generated, a counted value rty of a counter 42a is set to "0" in a step S19, and the JPEG codec 34 is instructed to perform the JPEG compression in a step S21. The JPEG codec 34 reads, as described above, the YUV signal from the display image area 28a through the memory control circuit 24 and performs the JPEG compression on the read YUV signal so as to determine the compressed size.

The determined compressed size value is taken from the JPEG codec 34 in a step S23, and it is determined whether or not the taken compressed size value satisfies the size condition of the above-described equation 2 in a following step S25. Herein, where the size condition is satisfied, the process proceeds to the motion image recording processing of a step S27. On the other hand, where the size condition is not satisfied, a compression ratio is renewed according to the equation 1 in a step S29, and the counted value rty is identified in a step S31. If the counted value doesn't reach "10", the counted value is incremented in a step S33, and then, the process returns to the step S21. On the other hand, if the counted value reaches "10", the process proceeds to the motion image recording processing of the step S27.

In the motion image recording process, the compressed YUV signal of each frame is accumulated every $\frac{1}{30}$ a second or $\frac{1}{15}$ a second in the compressed image area 28b, and the accumulated compressed YUV signal is recorded on the recoding medium 40 through the I/F circuit 36. After the motion image recording process is completed by canceling an operation of the shutter button 48, the process returns to the step S7.

It is noted that the identification processing of the counted value rty in the step S31 is processing to avoid infinite execution of a series of the steps S21 to S33 when the compression ratio satisfying the size condition shown in the equation 2 is not specified.

According to this embodiment, the optimal compression ratio of the YUV signal generated in response to an operation of the shutter button 48 (photographing instruction) is predicted prior to the operation of the shutter button 48. More specifically, the YUV signal of the object image photographed prior to the photographing instruction is compressed by the JPEG codec 34, and the optimal compression ratio is obtained on the basis of a size of the compressed YUV signal thus obtained. The YUV signal obtained in response to the photographing instruction is compressed on the basis of the optimal compression ratio, and the compressed YUV signal obtained by this compression processing is recorded on the recording medium 40. It is noted when the size of the compressed YUV signal according to the photographing instruction does not satisfy the size condition including the target size, the predicted optimal compression ratio is corrected, and the compression processing according to the corrected optimal compression ratio is executed again.

Thus, since the optimal compression ratio is predicted prior to the photographing instruction, it is possible to perform an appropriate motion image recording immediately after the photographing instruction. Furthermore, a resolution of the YUV signal is the same before and after the photographing instruction, and it is possible to identify a object image with ease by displaying on the monitor 32 the through image based on the YUV signal generated before application of the photographing instruction.

In addition, the display image area 28a is formed with the banks A and B, and the YUV signal outputted from the signal processing circuit 22 every $\frac{1}{30}$ second is alternately written to the banks A and B. The video encoder 30 reads the YUV signal from a bank to which no writing is performed, and the through image based on the read YUV signal is displayed on the monitor 32. The JPEG codec 34 also reads the YUV signal from a bank to which no writing is performed, and performs the JPEG compression on the read YUV signal. Accordingly, noise doesn't occur on the displayed through image with due to overwriting of the YUV signal, and furthermore, the JPEG compression can be executed appropriately.

Furthermore, the problem of image deterioration which occurs at the several frames from the top when the motion image recording is started using the initial compression ratio as a reference is conspicuous in proportion to the height of the resolution. However, in this embodiment, since the optimal compression ratio is predicted when any resolution is selected, it is possible to perform appropriate motion image recording from the start irrelevant to the selected resolution.

Figure 4:
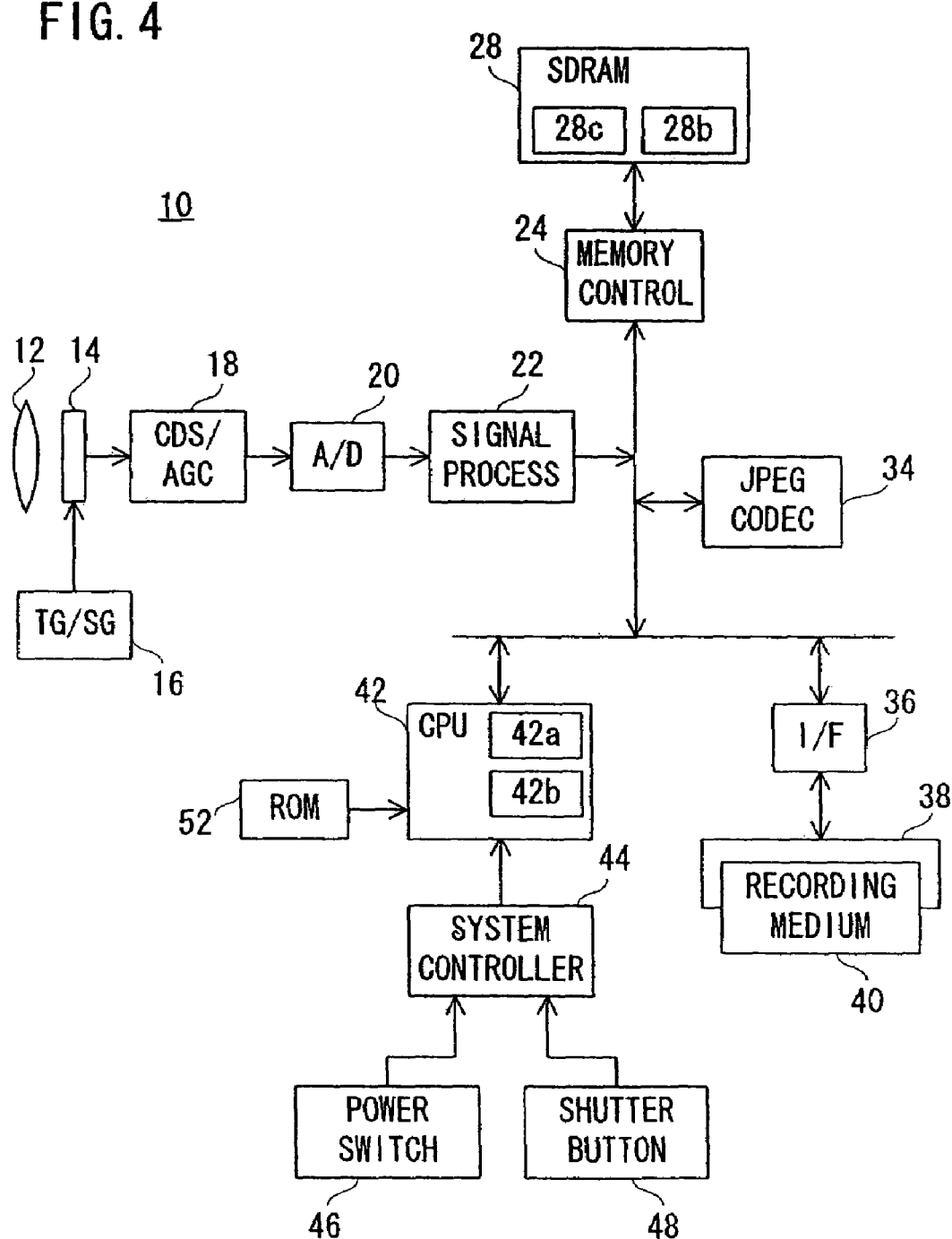
FIG. 4 is a block diagram showing another embodiment of the present invention.
Figure 5:
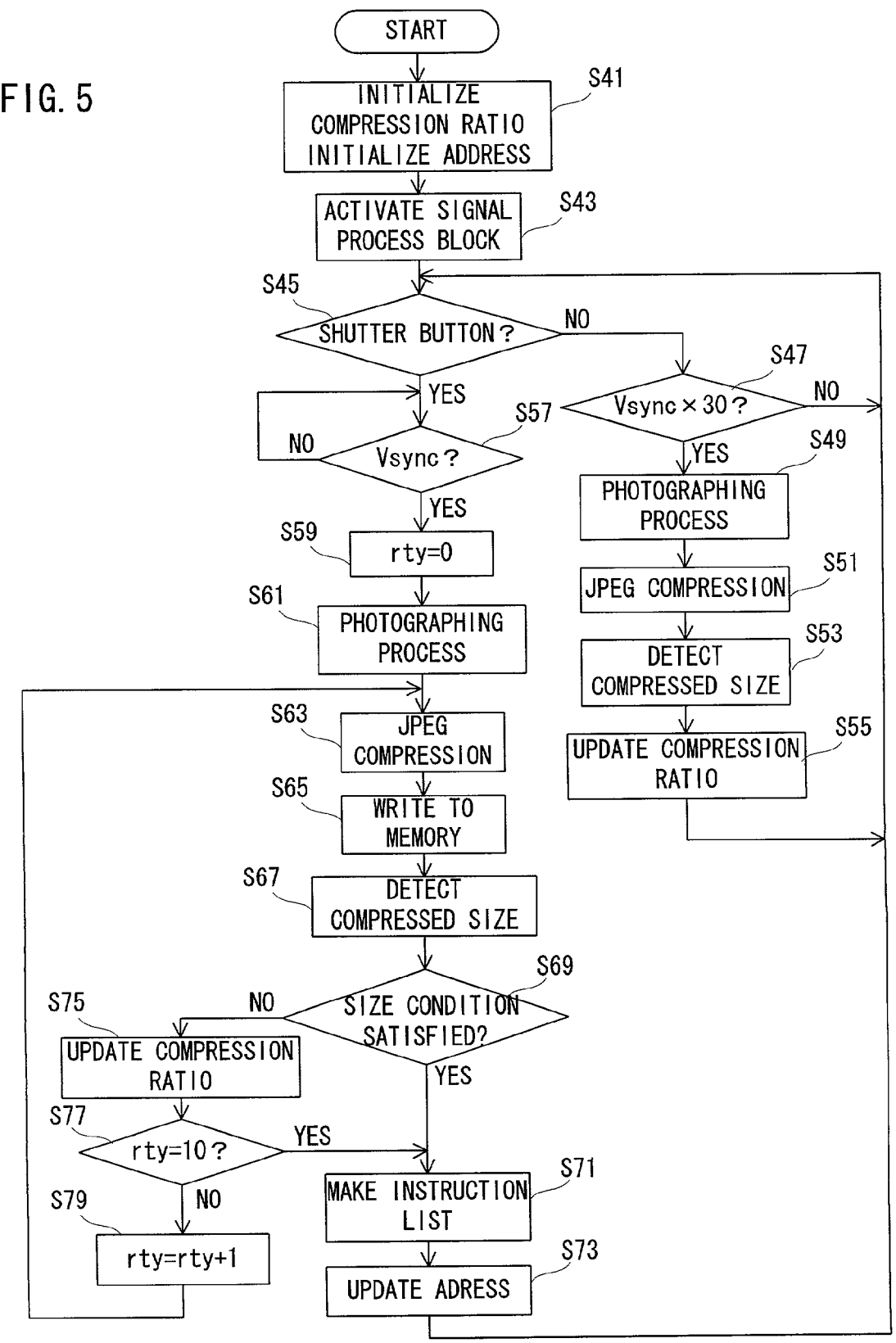
FIG. 5 is a flowchart showing a part of operation in FIG. 4 embodiment.

Referring to FIG. 4, a digital camera (surveillance camera) 10 of another embodiment is the same as the FIG. 1 embodiment except that it has a still image recording function in place of a motion image recording function, the resolution change-over switch 50, the bank switch circuit 26, the video encoder 30 and the monitor 32 are omitted, the SDRAM 28 is formed with a photographed image area 28c in place of the display image area 28a, and the ROM 52 is stored with a program corresponding to a flowchart shown in FIG. 5. Accordingly, a duplicate description will be omitted as little as possible, giving the same reference number to the same circuit.

When a power witch 46 is turned on, a CPU 42 instructs a TG/SG 16 to read out all the pixels every time a vertical synchronization signals is generated thirty times. The TG/SG 16 drives an image sensor 14 in an all the pixel reading-out scheme. Thus, a high-resolution RGB signals is outputted from the image sensor 14 at a ratio of one to thirty frames. The outputted RGB signal is applied to a signal processing circuit 22 through a CDS/AGC circuit 18 and an A/D converter 20 to be converted to a high-resolution YUV signal. The converted YUV signal is written to the photographed image area 28c through a memory control circuit 24. It is noted that the vertical synchronization signal is generated every $\frac{1}{7.5}$ second in this embodiment.

The CPU 42 instructs, at timing the YUV signal is written to the SDRAM 28, a JPEG codec 34 to perform compression processing. The JPEG codec 34 reads out the YUV signal stored in the photographed image area 28c through the memory control circuit 24 and performs the JPEG compression on the read YUV signal so as to determine a compressed size. The determined compressed size value is applied to the CPU 42, and the CPU 42 renews a compression ratio according to the above-described equation 1. The YUV signal based on the next all the pixels reading-out is compressed according to the renewed compression ratio.

When a shutter button 48 is pressed, the CPU 42 instructs the TG/SG 16 to read out all the pixels. Thus, a high-resolution YUV signal based on the all the pixels reading-out is stored in the photographed image area 28c of the SDRAM 28 as in the above-described manner. The CPU 42 instructs the JPEG codec 34 to compress the YUV signal and to write the compressed YUV signal into the compressed image area 28b. Accordingly, the JPEG codec 34 reads the YUV signal stored in the photographed image area 28c through the memory control circuit 24, performs the JPEG compression on the read YUV signal and writes the compressed YUV signal into the compressed image area 28b through the memory control circuit 24. The determination of the compressed size is also performed at this time, and the determined compressed size is taken-in by the CPU 42.

When the taken compressed size value satisfies the size condition shown in the equation 2, the CPU 42 sets a recording instruction of the compressed YUV signal into an instruction list 42b, and renews a writing address of the compressed image area 28c. The setting of the recording instruction to the instruction list 42b is a process for performing the BG process appropriately, and the renewal of the writing address is a process for preventing the compressed YUV signal from being overwritten.

On the other hand, when the taken compressed size vale does not satisfy the size condition, the compression ratio is renewed according to the equation 1, and instructs the JPEG codec 34 to compress the same YUV signal and to write the compressed YUV signal to the compressed image area 28b. Since the writing address of the compressed image area 28c is not renewed at this time, the compressed YUV signal based on the previous JPEG compression is overwritten by the compressed YUV signal based on the current JPEG compression. When the compressed size satisfies the size condition by repeating the JPEG compression, the recording instruction of the compressed YUV signal satisfying the size condition is set to the instruction list 42b, and the writing address of the compressed image area 28b is renewed. The compressed YUV signal accumulated in the compressed image area 28b is recorded on the recording medium 40 by the BG process.

Referring to FIG. 5, processing of the CPU 42 according to a program stored in the ROM 52 will be specifically described. It is noted the description of the BG process will be omitted.

The compression ratio of the JPEG codec 34 and the writing address of the compressed image area 28b are initialized in a step S41, and a signal processing block is activated in a step S43. It is determined whether or not the shutter button 48 is operated in a step S45, and it is determined whether or not the vertical synchronization signal is generated thirty times in step S47. When the vertical synchronization signal is generated thirty times in a state the shutter button 48 is not operated, "YES" is determined in the step S47. Then, the TG/SG 16 is instructed to read out all the pixels in a step S49, and the JPEG codec 34 is instructed to perform compression processing in a step S51.

The TG/SG 16 performs all the pixels reading-out on the image sensor 14. The high-resolution YUV signal based on the all the pixels reading-out is written to the photographed image area 28c of the SDRAM 28. The JPEG codec 34 reads out the high-resolution YUV signal stored in the photographed area 28c through the memory control circuit 24, and actually performs the JPEG compression on the read high-resolution YUV signal so as to determine the compressed size. The determined compressed size value is taken from the JPEG codec 34 in a step S53, and the compression ratio set to the JPEG codec 34 is renewed according to the equation 1 in a following step S55. Thus, an optimal compression ratio of the YUV signal obtained in response to an operation of the shutter button 48 is predicted.

When the shutter button 48 is operated, "YES" is determined in the step S45, and it is determined whether or not the vertical synchronization signal is generated in step a S57. When the first vertical synchronization signal after the operation of the shutter button 48 is generated, the process proceeds from the step S57 to a step S59 so as to set a counted value rty of a counter 42a to "0". Successively, the TG/SG 16 is instructed to read out all the pixels in a step S61, and the JPEG codec 34b is instructed to perform compression processing on a high-resolution YUV signal and to write the compressed YUV signal to the SDRAM 28 in steps S63 and S65.

The high-resolution YUV signal based on the all the pixels reading-out by the TG/SG 16 is stored in the photographed image area 28c of the SDRAM 28, and the high-resolution YUV signal is subjected to JPEG compression by the JPEG codec 34. The compressed YUV signal thus generated is written to the compressed image area 28b of the SDRAM 28. Furthermore, a size of the compressed YUV signal is determined by the JPEG codec 34. The compressed size value is taken from the JPEG code 34 in a step S67, and it is determined whether or not the taken compressed size value satisfies the size condition of the equation 2 in a following step S69.

When the size condition is satisfied, the recording instruction of the compressed YUV signal is set to the instruction list 42b in a step S71, and the writing address of the compressed image area 28c is renewed in a step S73. When the renewal of the writing address is completed, the process returns to the step S45 so as to prepare for the next operation of the shutter button 48. On the other hand, when the size condition is not satisfied, the compression ratio is renewed according to the equation 1 in a step S75, and the counted value rty is identified in a step S77. Herein, where the counted value rty reaches "10", the process proceeds to the step S71. Where the counted value rty does not reach "10", the counted value rty is incremented in a step S79, and the process returns to the step S63. As a result, the high-resolution YUV signal stored in the photographed image area 28c is compressed again at the compression ratio after updating, and the compressed YUV signal thus obtained is written to the compressed image area 28b.

Since the writing address is not renewed, the compressed YUV signal obtained by the previous compression is overwritten by the compressed YUV signal obtained by the current compression.

Also in this embodiment, since the optimal compression ratio is predicted prior to the photographing instruction, it is possible to shorten a time from an application of the photographing instruction to a generation of the compressed YUV signal satisfying the size condition. That is, it is possible to shorten a shutter interval.

It is noted that in a case the digital camera of the above-described embodiment is utilized as a surveillance camera, a photographing instruction is outputted from a timer for detecting a time or a sensor for detecting unwanted people, and the monitor in the FIG. 1 embodiment is set in a control center.

Furthermore, either CCD type or CMOS type may be utilized as an image sensor for photographing an object image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera that periodically creates, until a recording Instruction is issued, a first still image corresponding to an object scene in such a manner as a real time display is omitted, and creates, when the recording instruction is issued, a second still image corresponding to the object scene so as to record the second still image into a recording medium in a compressed state, comprising:

a calculator for calculating a specific compression ratio coefficient capable of compressing the first still image to a specific size;

a compressor for compressing the second still image by use of the specific compression ratio coefficient;

a corrector for correcting the specific compression ratio coefficient when a compressed second still image created by said compressor fails to satisfy a size condition including the specific size; and a recorder for recording the compressed second still image satisfying the size condition into said recording medium, wherein the first still image and the second still image have the same resolution with each other.

2. A digital camera according to claim 1, wherein said calculator includes a first still image compressor for compressing the first still image, and a calculation executor for calculating the specific compression ratio coefficient on the basis of a compressed first still image created by said first still image compressor.

3. A digital camera according to claim 1, wherein said recorder records a newest compressed second still image into said recording medium when the number of compressing operations directed to the second still image reaches a threshold value.

4. A digital camera according to claim 1, further comprising a shutter button to issue the recording instruction.

* * * * *